United States Patent
Garside et al.

(10) Patent No.: US 7,970,812 B2
(45) Date of Patent: Jun. 28, 2011

(54) REDISTRIBUTION OF SPACE BETWEEN TEXT SEGMENTS

(75) Inventors: Adrian J. Garside, Sammamish, WA (US); Alice Dai, Redmond, WA (US); Takanobu Murayama, Seattle, WA (US); Tracy D. Schultz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1057 days.

(21) Appl. No.: 11/081,830

(22) Filed: Mar. 17, 2005

(65) Prior Publication Data

US 2006/0242608 A1    Oct. 26, 2006

(51) Int. Cl.
*G06F 15/16* (2006.01)

(52) U.S. Cl. ........ 709/200; 345/170; 345/171; 345/467; 345/468; 345/469; 345/470; 345/471; 345/472; 382/187; 382/188; 382/189; 715/863

(58) Field of Classification Search ................ 709/200; 345/170, 171, 467–472, 773; 382/187–189; 715/863

See application file for complete search history.

(56) References Cited

U.S. PATENT DOCUMENTS

| | | | | |
|---|---|---|---|---|
| 5,396,566 A | * | 3/1995 | Bruce et al. | 382/187 |
| 5,666,499 A | * | 9/1997 | Baudel et al. | 715/808 |
| 5,742,705 A | * | 4/1998 | Parthasarathy | 382/185 |
| 6,011,879 A | * | 1/2000 | Nemoto et al. | 382/301 |
| 6,438,509 B1 | * | 8/2002 | Hayama et al. | 702/155 |
| 6,603,881 B2 | * | 8/2003 | Perrone et al. | 382/186 |
| 2002/0165873 A1 | * | 11/2002 | Kwok et al. | 707/500 |
| 2004/0205642 A1 | * | 10/2004 | Menninga | 715/529 |

FOREIGN PATENT DOCUMENTS

JP     07191659 A  *  7/1995

\* cited by examiner

*Primary Examiner* — Yves Dalencourt
*Assistant Examiner* — Michael C Lai
(74) *Attorney, Agent, or Firm* — Shook Hardy & Bacon L.L.P.

(57) ABSTRACT

A system and method for redistributing space in ink-to-text conversions is described. In stylus-based computing systems, users often desire to convert ink from ink into text. Sometimes the conversion is made such that an interaction region is made too small for effective recognition correction or interaction. A system and procedure is described that adjusts the spacing of text to allow easier interaction with the recognition results.

22 Claims, 6 Drawing Sheets

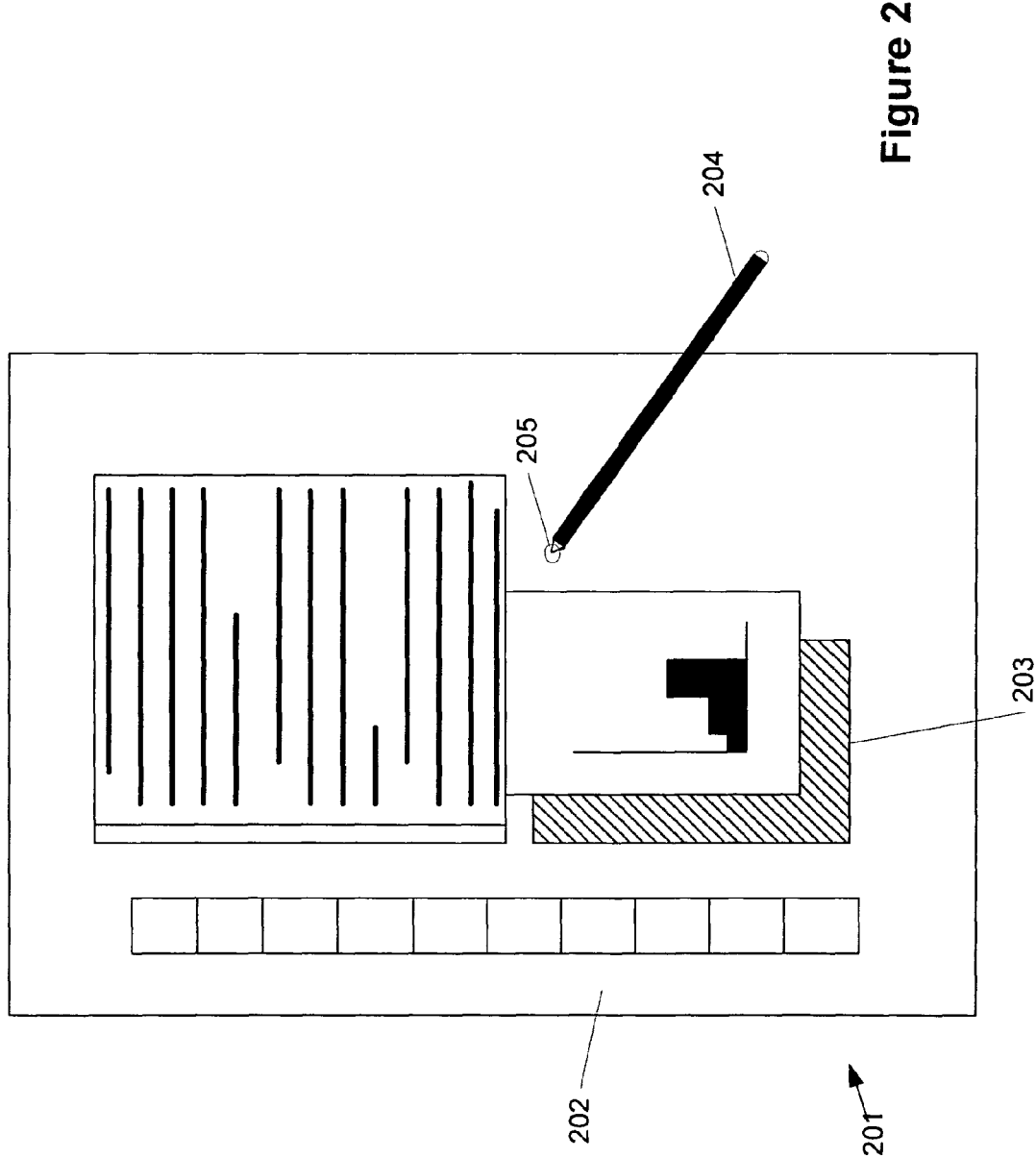

REDISTRIBUTION OF SPACE BETWEEN TEXT SEGMENTS

BACKGROUND OF THE INVENTION

1. Field of the Invention

Aspects of the present invention relate to computing systems. More particularly, aspects of the present invention relate to adjusting space between handwritten segments.

2. Description of Related Art

Stylus-based computing is gaining a more widespread acceptance in the computing community. One of the interesting aspects of stylus-based computing is the ability to convert handwritten electronic ink into text. In some situations, the conversion to text does not allow modification or correction of the recognized text beyond rewriting the ink. In other situations, the conversion to text may include a modification interface that permits correction or at least provides other alternate recognition results from which a user may select alternate text.

One concern with conventional rendering systems is that the text may be combined or spaced in such a way as to make some elements (for example, punctuation symbols and other thin marks) difficult to select and/or correct. While providing a pleasing visual presentation of the converted text, the ability to interact with narrow text areas is lessened.

This ability is further decreased with the inclusion of East Asian characters as recognition results. In some cases, a single character may be recognized as separate components, namely with each radical being considered a separate word. The resulting text may be overly narrowed to the point that interaction with any one radical may be effectively eliminated.

One solution is to standardize each recognition result as having a fixed width. This approach fails to accurately address the differences between the sizes of recognized text and/or symbols (with the longer or more complex symbols being compress to the space of simpler text and/or symbols).

Also, input method editor (IME) conversions from a single character to multiple characters can be problematic for users as expanding a single character to many may force the user's current writing area to a side, thereby forcing the user to readjust his or her writing position to accommodate the modified display.

A process and system is needed that addresses overly narrow recognition results while providing a method of redistributing space in ink-to-text conversions.

BRIEF SUMMARY OF THE INVENTION

Aspects of the present invention address one or more of the problems described above, thereby improving the rendering of ink-to-text conversion results.

BRIEF DESCRIPTION OF THE DRAWINGS

Aspects of the present invention are illustrated by way of illustrative examples and not limited in the accompanying figures.

FIG. 2 shows an illustrative example of a tablet computer in accordance with aspects of the present invention.

DETAILED DESCRIPTION OF THE INVENTION

Figure 1:
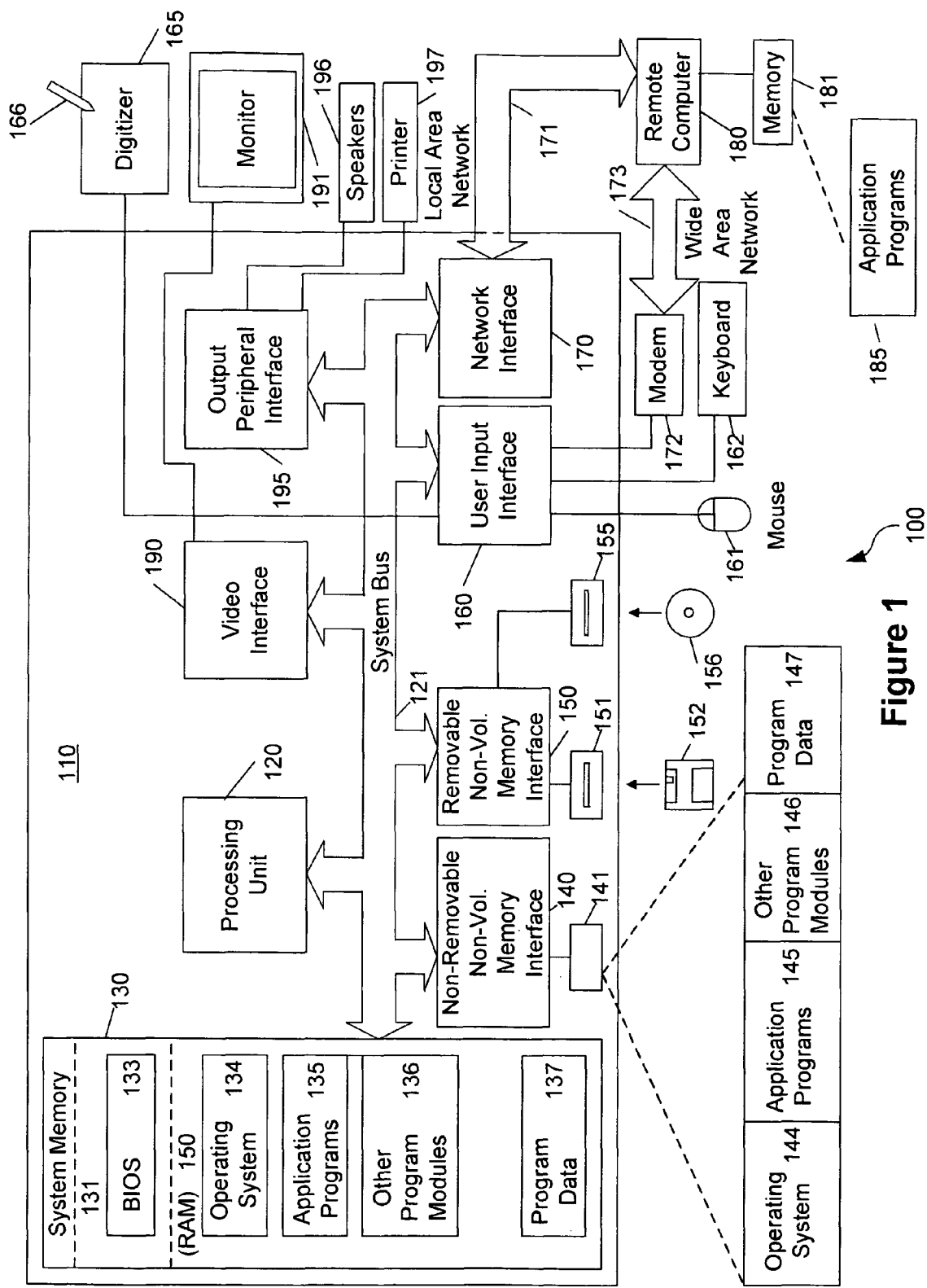
FIG. 1 illustrates a schematic diagram of a general-purpose digital computing environment in which certain aspects of the present invention may be implemented.

Aspects of the present invention relate to providing improved rendering of recognition results in an ink-to-text conversion.

This document is divided into sections to assist the reader. These sections include: overview, characteristics of ink, terms, general-purpose computing environment, and redistribution of space between segments.

It is noted that various connections are set forth between elements in the following description. It is noted that these connections in general and, unless specified otherwise, may be direct or indirect and that this specification is not intended to be limiting in this respect.

Overview

According to various examples of the invention, a system and method may be used that address the spacing and/or size of conversion results. Handwriting recognition systems are known. While providing good results, the results are not always accurate. Accordingly, systems provide users with the ability to interact with the recognized text to correct any incorrect recognition results.

In some aspects of the present invention, the spacing of recognition results may be modified to provide at least a minimum width. In other aspects of the present invention, the font size of recognition results may be modified to provide an easily accessible area to modify the recognition results. Aspects of the invention may or may not use a tablet input panel (TIP) associated with Windows XP Tablet Edition operating system (from Microsoft Corporation of Redmond, Wash.). Some aspects of the present invention may be embodied in rendering engines or other systems or applications and the like.

The ink recognized may take nearly any form including bitmapped or other types of images or may have its own file format (for example but not limited to, ISF (ink serialized format) available from the Microsoft Corporation).

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Further examples include the way ink is absorbed into the fibers of paper or other surface it is deposited on. These subtle characteristics also aid in conveying the above listed properties. Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Among the characteristics described above, the temporal order of strokes and a stroke being a series of coordinates are primarily used. All these characteristics can be used as well.

| Terms | |
|---|---|
| Term | Definition |
| Ink | A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level. |
| Ink object | A data structure storing ink with or without properties. |
| Stroke | A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points. |
| Document | Any electronic file that has a viewable representation and content. A document may include a web page, a word processing document, a note page or pad, a spreadsheet, a visual presentation, a database record, image files, and combinations thereof. |
| Render or Rendered or Rendering | The process of determining how information (including text, graphics, and/or electronic ink) is to be displayed, whether on a screen, printed, or output in some other manner. |
| Computer-readable medium | Any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. |
| Computer storage media | "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. |
| Communication media | "Communication media" typically embodies computer-readable instructions, data structures, program modules or other data in a modulated data signal, such as a carrier wave or other transport mechanism, and includes any information delivery media. |
| Modulated data signal | The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media." |

General-Purpose Computing Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Redistribution of Space Between Segments

Figure 3A:
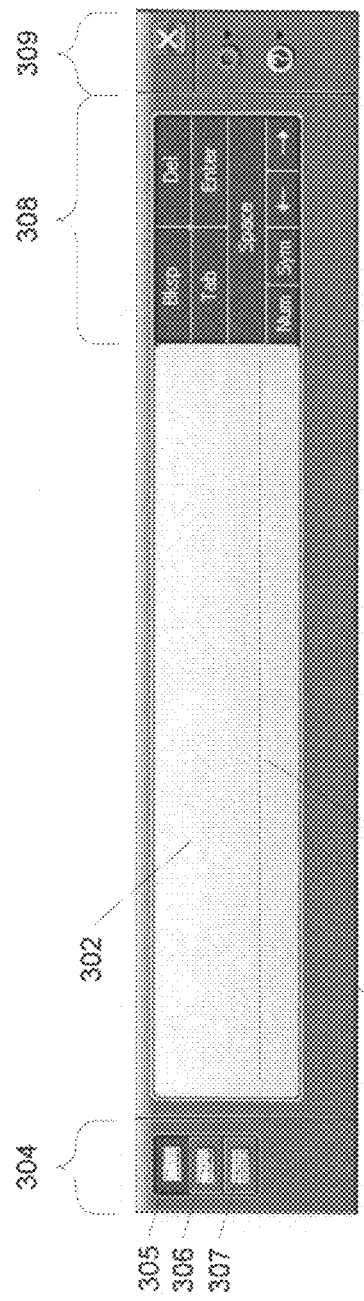
FIGS. 3A-3C show illustrative ink input regions in accordance with aspects of the present invention.
Figure 3B:
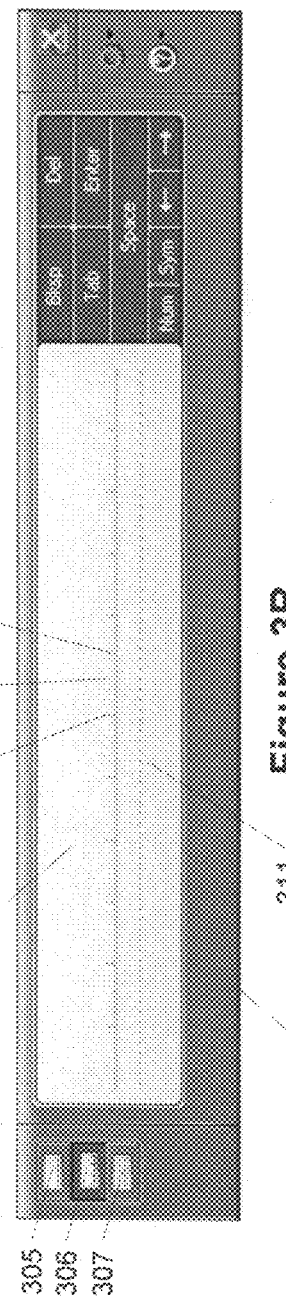
Figure 3C:
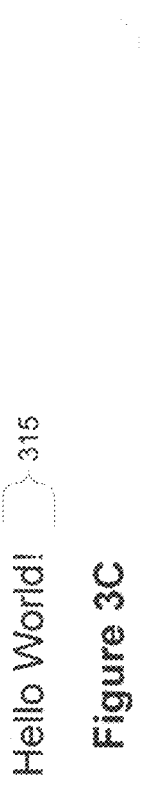

FIGS. 3A-3C various examples of ink input regions associated with stylus-based computers which are later converted to text. Other input regions are known in the art and can be used in combination with aspects of the present invention.

FIG. 3A shows an ink input region 301 with space 302 for receiving ink and a visual guide 303. Control buttons in regions 304, 308, and 309 may or not also be shown for use by the user. Control buttons 305-307 provide the user with the ability to change the format of input region 302 from a single guide (button 305), to a plurality of input regions (button 306), and a keyboard input (button 307).

FIG. 3B shows an example of a plurality of input regions 310 and 314, separated by guide marks 312 and 313, among others. Horizontal guide 311 may or may not also be shown.

FIG. 3C shows a free-form input region in which ink is converted to text, for instance, based on user selection or designation. In short any ink input region may be used.

Figure 4:
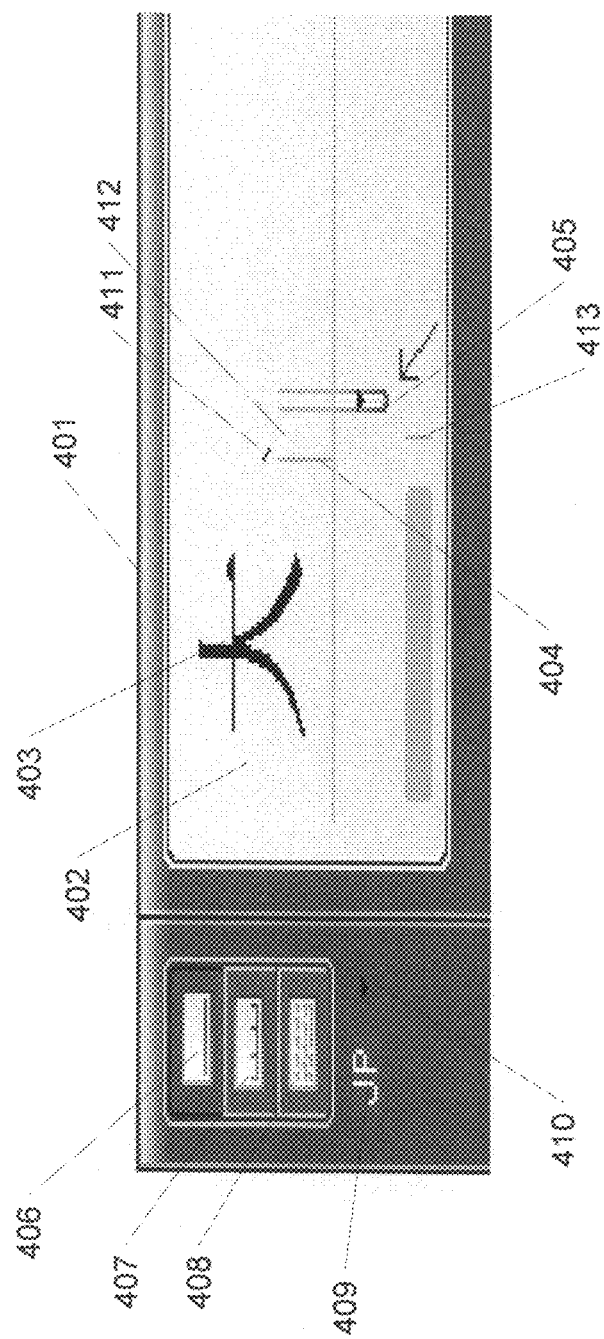
FIG. 4 shows an illustrative example of electronic ink with a narrow region in accordance with aspects of the present invention.

FIG. 4 shows an example of recognition results in accordance with aspects of the present invention. Region 401 includes Japanese character 403 in space 402 as defined by guide 404. Character 411 has been recognized as a separate character and provided with its own space 412. Character 411 may be provided with a modification interface 405 or 413. The widths of modification interfaces 405 and 413 are narrow because of the narrow width of character 411. The narrow shape of character 411 and the associated modification regions 405 and 413 may make it difficult or impossible for users to cleanly interact with the correction interface or even select character 411. Here, a region 401 may optionally include control buttons 406-408, with a displayed current language recognizer 409, and an option to change the language 410.

For instance, the narrowest of the boxes defined by guides 404 may make it impossible for a user to write a different character in the box or sometime even to delete the original tiny character. This problem occurs with high frequency with Chinese, Japanese and Korean or any other East Asian characters due to recognition errors that identify one or more of the many strokes that make up these complex characters as separate miniscule characters.

Figure 5:
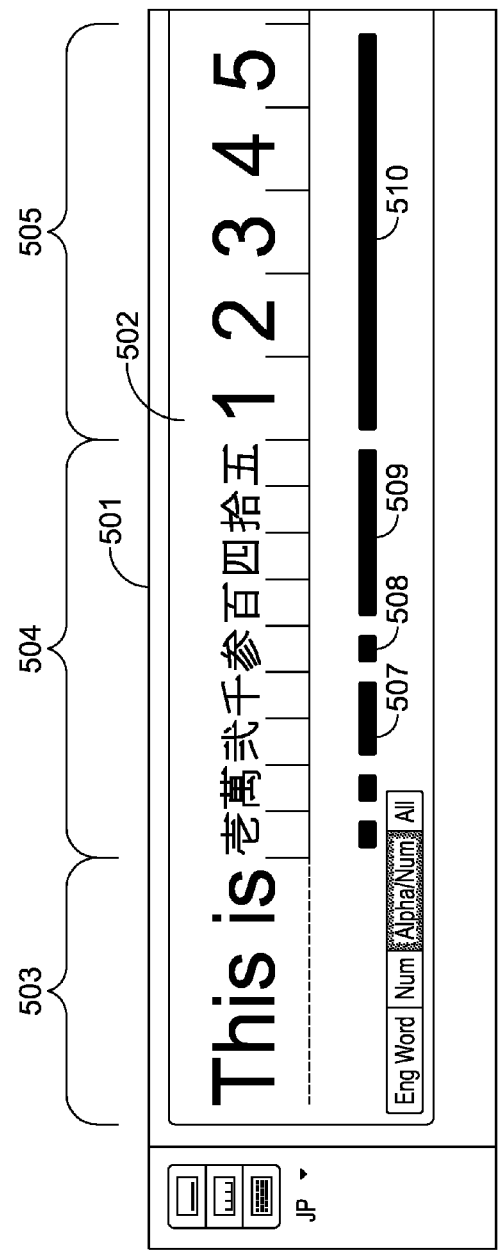
FIG. 5 shows an illustrative example of electronic ink with narrow regions for characters in accordance with aspects of the present invention.

Additionally, when a user converts, for instance, one Kana character to many Kanji characters the original box width may be sub divided creating several skinny boxes from one normal sized box. FIG. 5 shows an example of this conversion and resulting size. Input region 501 includes space 502 to accept characters. Some recognition results may be in English 503 and 505. Others may be another language 504. Here, characters in region 504 have been converted from one or more characters from one set of characters to another set of characters. The difficulty is that to preserve the spacing between regions 503 and 505, the resulting regions 504 have been shrunk to fit. Here, the smaller size of characters 504 makes interaction with a modification interface 507-510 difficult, for instance.

Further, even English conversation has its difficulties. For instance, punctuation may be recognized separate from a word. This separate recognition results in a very narrow interface, for example, for exclamation points or periods that have not been combined with other words.

The following describes an approach to addressing the above issues, thereby reducing the frequency of tiny boxes produced by redistributing space between all boxes on a line. In one embodiment, the algorithm does so without moving the right most edge of the right most character to avoid interfering with the writing of new characters that a user may be doing simultaneously. Alternatively, the approach may also redefine the spacing of ink currently being written. For the purpose of simplicity, the invention is described as taking place to one side or another of a current location where a user is writing. The current inking location may remain fixed and the location and/or spacing of recognized text may be modified.

Finally, the approach helps to produce a more uniform UI by normalizing the size of characters.

When a box is created that is less than the minimum box width, the width of the new box and the widths of all existing boxes to the left and on the same line as the new box are redistributed. The minimum box width for East Asian (described herein as "EA") lined input (FIG. 3A) and EA boxed input (FIG. 3B) in English Word mode may be predefined (for instance, 10 mm or so). The minimum box width for EA Box Input in All, Alpha/Num or Num modes is determined by the user controlled setting. One advantage of redistributing the widths of the boxes is to assure all boxes are greater than or equal to the minimum width whenever possible. When it is not possible for the width of all boxes to be greater than or equal to the minimum width, the redistribution has a secondary goal of dividing the space deficiency amongst all the boxes.

Each new box size may be based on the sum of the old box width, the total number of characters, and the number of characters in the box. EA characters may be allotted a different width compared to alphanumeric characters (for instance, twice as much width as alphanumeric characters, 1.9, 2.5, etc.). The new box sizes may be determined as follows.

First a segment is determined by the following:

```
SEGMENT = (sum of old box widths) / (2 * (total # of EA
characters) + (total
# of alphanumeric characters))
For each box {
    If box contains EA character(s){
        BOX_WIDTH = 2 * SEGMENT
    } else {
        BOX_WIDTH = SEGMENT * (# of characters in the box)
    }
}
```

Of course, any ratio between EA character and alphanumeric characters may be used.

Once the new box sizes are calculated, the font size of each character is adjusted to fit in the new boxes. The new font size is determined in the same way the font size for new characters is calculated. The new font sizes may be calculated as follows:

```
FONT_SIZE = 3/4 * (height of box in pixels)
TEXT_WIDTH = the width of the text using FONT_SIZE
If(TEXT_WIDTH >= (width of the box)){
    FONT_SIZE = FONT_SIZE * (width of the box) /
    TEXT_WIDTH
}
```

After calculating the new font size and box widths, the affected characters and boxes are redrawn using the new sizes. All user interfaces and information associated with a box for which the width is redistributed is similarly repositioned so that it is still associated with same box. In one embodiment, redistribution never causes the right edge of the newest or left most box to be repositioned (which may be dependent on the writing direction of the user—left to right or right to left). For instance, for English (a Left to Right Language), a current location may remain fixed while the spacing of recognized text to the left of the current writing location may be adjusted. Right to Left languages (RTL) (languages that are read/written right to left) have the same issue. Here, the constraint is now that the left edge of the left most character does not move and everything to the right can be safely adjusted. An example of RTL is Hebrew. Accordingly, the algorithm described herein may be modified to accommodate RTL languages as well.

Figure 6:
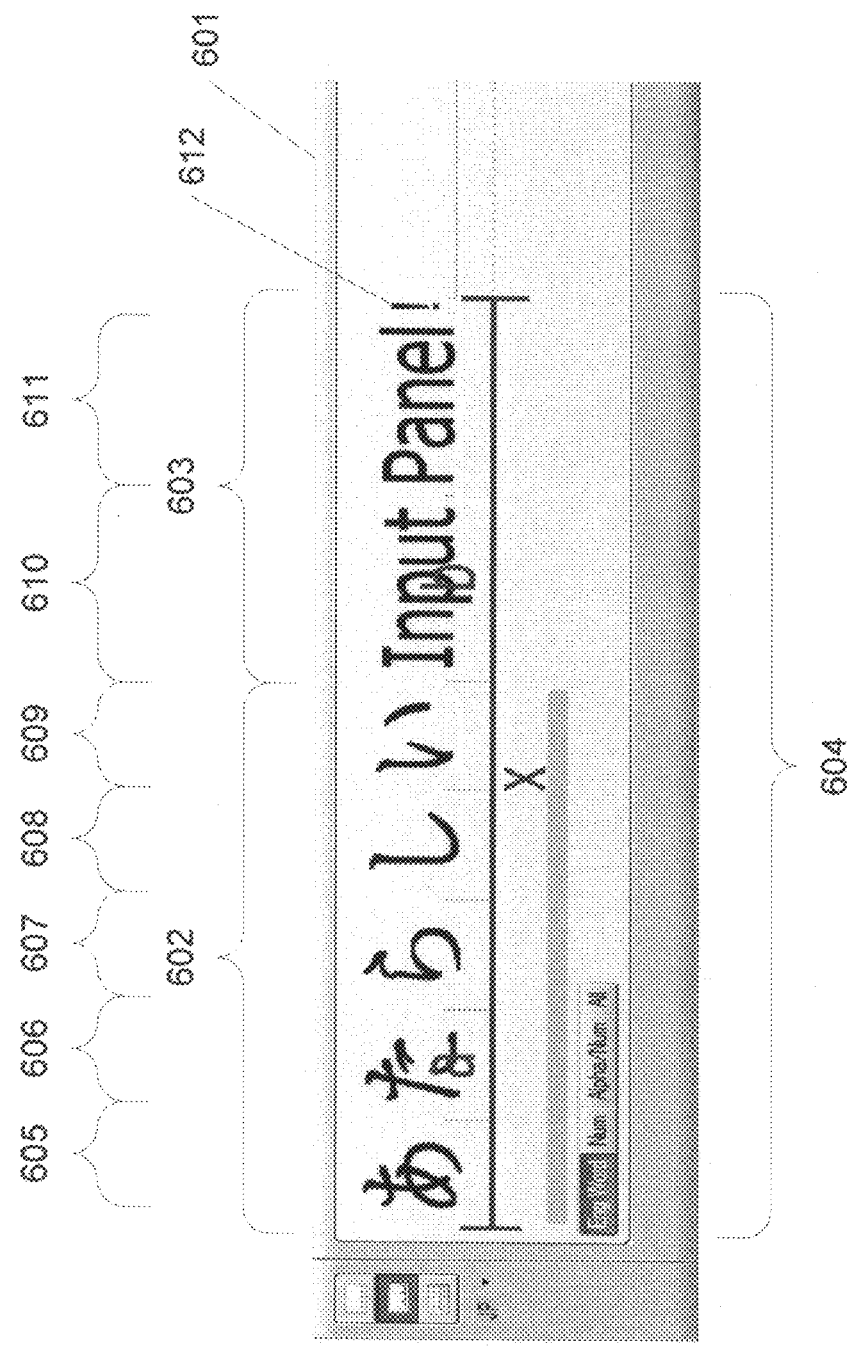
FIG. 6 shows an illustrative example of distributed ink in accordance with aspects of the present invention.

Text may be redistributed where all text is provided with an equal weighting. Alternatively, text may be redistributed with text of one language (or symbol set) is provided with a different weighting than another. FIG. 6 shows an example of how text may be redistributed with recognized text from a first and second language having different weightings. FIG. 6 shows input region 601. Some ink has been converted to an East Asian language 602, other ink has been converted to alphanumeric information 603. For reference, the EA language text 602 is shown to have five characters 605-609. The alphanumeric text 603 is shown to include three words 610 and 611 (shown to include multiple characters each) and punctuation 612.

It should be noted that, even within the same language, different weightings may be given to different character groups (for instance, punctuation may be provided with greater spacing than alphanumeric information).

The sizes of regions 606 and 610 may be determined as follows:

$$SEGMENT = x/((2*5)+11)$$

$$a = 2*SEGMENT$$

$$b = SEGMENT*5$$

In the EA Boxed Input skin (for instance FIG. 3B), redistribution is not bounded by the input mode, only by the length of the line in the input region. This means the creation of a tiny box in English Word mode can trigger the redistribution of the boxes to its left even if those boxes were created in a mode which recognized all characters (not just EA or numbers or alphanumeric). The creation of a box smaller than the minimum box size triggers a redistribution of the boxes to its left even when some of the boxes to its right contain text.

When a new box is added or, for instance, a Japanese user performs a KKC conversion in a line that contains one or more boxes with widths less than the minimum box size, a redistribution is triggered if it will result in a gain (for instance, 3 mm or greater) in width for any of the boxes on the line which are less than the minimum box size.

As described above, the width modification of characters may take place only to one side or another from where a current user is writing, in order to prevent any interference with the user writing. In other embodiments, the modification of characters may occur at the user's current inking location.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A computer storage medium having instructions stored thereon, said instructions causing a computer to perform a process, said process for adjusting spacing of recognition results and comprising the steps of:
   receiving recognition results from ink-to-text conversions, wherein the recognition results include a plurality of characters of varying size converted from user-entered electronic ink;
   displaying the recognition results, wherein the plurality of characters are displayed in a plurality of display boxes arranged in a line, wherein the edge of the displayed recognition results that is closest to the middle of the display is a current writing location capable of receiving additional user-entered electronic ink, wherein each character has an initial character width and an initial font size, wherein each of the plurality of display boxes has an initial box width and contains at least one character, the initial box width of each of the plurality of display boxes equal to the sum of the initial character widths of the characters in the correspinding display box, and wherein the display includes at least one modification region that receives user selection or editing of at least one of the plurality of characters included in the recognition results;

determining that a first display box has an initial box width that is less than a minimum width predefined by a user-controlled setting;

calculating an adjusted box width for the first display box based on the total width of the plurality of display boxes in the line, the total number of characters in the plurality of display boxes in the line, and the number of characters in the first display box;

adjusting a font size of each character within the first display box to create adjusted characters such that each of the adjusted characters fits within the adjusted box width of the first display box; and adjusting the displayed recognition results to reflect the adjusted box width of the first display box and the adjusted characters, wherein the current writing location remains fixed during the adjustment such that the adjustment does not affect the overall width of the displayed recognition results.

2. The medium of claim 1, wherein each of the characters is either a character of a first type or a character of a second type.

3. The medium of claim 2, wherein calculating the adjusted box width includes calculating the total number of characters of the second type in the line and the total number of characters of the first type in the line.

4. The medium of claim 3, wherein characters of the first type are alpha-numeric characters, and wherein characters of the second type are East Asian characters.

5. The medium of claim 4, wherein calculating the adjusted box width further includes:

determining a first term equal to the total number of alpha-numeric characters in the line and a second term equal to the total number of East Asian characters in the line; and determining a weighted second term by multiplying the second term by a weighting factor.

6. The medium of claim 5, wherein calculating the adjusted box width further includes calculating a third term equal to the sum of the first term and the weighted second term.

7. The medium of claim 6, wherein calculating the adjusted box width further includes:

calculating a fourth term equal to the sum of the initial box widths of all of the display boxes in the line;

calculating a unit segment by dividing the fourth term by the third term;

when the first display box contains at least one East Asian character, determining the adjusted box width to be the unit segment multiplied by the weighting factor; and when the first display box does not contain at least one East Asian character, determining the adjusted box width to be the unit segment multiplied by the number of characters in the first display box.

8. The medium of claim 2, wherein, when the plurality of characters in the line includes at least one character of the second type and at least one character of the first type, calculating the adjusted box width further includes:

determining a first term equal to the total number of characters of the first type in the line;

determining a second term equal to the total number of characters of the second type in the line;

determining a weighted second term by multiplying the second term by a weighting factor;

calculating a third term equal to the sum of the first term and the weighted second term;

calculating a fourth term equal to the sum of the initial box widths of all of the display boxes in the line;

calculating a unit segment by dividing the fourth term by the third term;

when the first display box contains at least one character of the second type, determining the adjusted box width to be the unit segment multiplied by the weighting factor; and when the first display box does not contain at least one character of the second type, determining the adjusted box width to be the unit segment multiplied by the number of characters in the first display box.

9. The medium of claim 2, wherein when the plurality of characters in the line does not include at least one character of the second type, calculating the adjusted box width further includes:

calculating a first term equal to the total number of characters in the line;

calculating a second term equal to the sum of the initial box widths of all of the display boxes in the line;

calculating a unit segment by dividing the second term by the first term; and determining the adjusted box width to be the unit segment multiplied by the total number of characters in the first display box.

10. The medium of claim 1, wherein adjusting the displayed recognition results redistributes the total amount of space in the recognition results among each of the plurality of display boxes.

11. The medium of claim 1, wherein the process further comprises:

determining a user writing direction, wherein the writing direction is either a right-to-left direction or a left-to-right direction, wherein when the user writing direction is a right-to-left direction, the recognition results are displayed the right of the current writing location, and wherein when the writing direction of the user is a left-to-right direction, the recognition results are displayed to the left of the current writing location.

12. A computing device comprising:

a processor; and a computer storage medium having instructions stored thereon that, when executed by said processor, cause said computing device to perform a process, said process comprising the steps of:

receiving recognition results from ink-to-text conversions, wherein the recognition results include a plurality of characters of varying size converted from user-entered electronic ink;

displaying the recognition results, wherein the plurality of characters are displayed in a plurality of display boxes arranged in a line, wherein the edge of the displayed recognition results that is closest to the middle of the display is a current writing location capable of receiving additional user-entered electronic ink, wherein each character has an initial character width and an initial font size, wherein each of the plurality of display boxes has an initial box width and contains at least one character, the initial box width of each of the plurality of display boxes, boxes equal to the sum of the initial character widths of the characters in the corresponding display box, and wherein the display includes at least one modification region that receives user selection or editing of at least one of the plurality of characters included in the recognition results;

determining that a first display box has an initial box width that is less than a minimum width predefined by a user-controlled setting;

calculating an adjusted box width for the first display box based on the total width of the plurality of display boxes in the line, the total number of characters in the plurality of display boxes in the line, and the number of characters in the first display box;

adjusting a font size of each character within the first display box to create adjusted characters such that each of the adjusted characters fits within the adjusted box width of the first display box; and adjusting the displayed recognition results to reflect the adjusted box width of the first display box and the adjusted characters, wherein the current writing location remains fixed during the adjustment such that the adjustment does not affect the overall width of the displayed recognition results.

13. The computing device of claim 12, wherein each of the characters is either a character of a first type or a character of a second type.

14. The computing device of claim 13, wherein calculating the adjusted box width includes calculating the total number of characters of the second type in the line and the total number of characters of the first type in the line.

15. The computing device of claim 14, wherein characters of the first type are alpha-numeric characters, and wherein characters of the second type are East Asian characters.

16. The computing device of claim 15, wherein calculating the adjusted box width further includes:
determining a first term equal to the total number of alpha-numeric characters in the line and a second term equal to the total number of East Asian characters in the line; and
determining a weighted second term by multiplying the second term by a weighting factor.

17. The computing device of claim 16, wherein calculating the adjusted box width further includes calculating a third term equal to the sum of the first term and the weighted second term.

18. The computing device of claim 17, wherein calculating the adjusted box width further includes:
calculating a fourth term equal to the sum of the initial box widths of all of the display boxes in the line;
calculating a unit segment by dividing the fourth term by the third term;
when the first display box contains at least one East Asian character, determining the adjusted box width to be the unit segment multiplied by the weighting factor; and
when the first display box does not contain at least one East Asian character, determining the adjusted box width to be the unit segment multiplied by the number of characters in the first display box.

19. The computing device of claim 13, wherein, when the plurality of characters in the line includes at least one character of the second type and at least one character of the first type, calculating the adjusted box width further includes:
determining a first term equal to the total number of characters of the first type in the line;
determining a second term equal to the total number of characters of the second type in the line;
determining a weighted second term by multiplying the second term by a weighting factor;
calculating a third term equal to the sum of the first term and the weighted second term;
calculating a fourth term equal to the sum of the initial box widths of all of the display boxes in the line;
calculating a unit segment by dividing the fourth term by the third term;
when the first display box contains at least one character of the second type, determining the adjusted box width to be the unit segment multiplied by the weighting factor; and
when the first display box does not contain at least one character of the second type, determining the adjusted box width to be the unit segment multiplied by the number of characters in the first display box.

20. The computing device of claim 13, wherein when the plurality of characters in the line does not include at least one character of the second type, calculating the adjusted box width further includes:
calculating a first term equal to the total number of characters in the line;
calculating a second term equal to the sum of the initial box widths of all of the display boxes in the line;
calculating a unit segment by dividing the second term by the first term; and
determining the adjusted box width to be the unit segment multiplied by the total number of characters in the first display box.

21. The computing device of claim 12, wherein said processor redistributes the amount of space among each of the plurality of display boxes.

22. The computing device of claim 12, wherein the process further comprises:
determining a user writing direction, wherein the writing direction is either a right-to-left direction or a left-to-right direction,
wherein when the user writing direction is a right-to-left direction, the recognition results are displayed to the right of the current writing location, and
wherein when the writing direction of the user is a left-to-right direction, the recognition results are displayed to the left of the current writing location.

* * * * *

UNITED STATES PATENT AND TRADEMARK OFFICE
CERTIFICATE OF CORRECTION

| | | |
|---|---|---|
| PATENT NO. | : 7,970,812 B2 | Page 1 of 1 |
| APPLICATION NO. | : 11/081830 | |
| DATED | : June 28, 2011 | |
| INVENTOR(S) | : Adrian J. Garside et al. | |

It is certified that error appears in the above-identified patent and that said Letters Patent is hereby corrected as shown below:

IN THE CLAIMS:

In column 11, line 13, in Claim 1, delete "correspinding" and insert -- corresponding --, therefor.

In column 12, line 50, in Claim 11, after "displayed" insert -- to --.

In column 13, line 10, in Claim 12, after "boxes" delete ", boxes".

Signed and Sealed this
Thirtieth Day of August, 2011

David J. Kappos
*Director of the United States Patent and Trademark Office*